A. A. VEDDER.
Axle-Lubricator.
No. 18,364.
Patented Oct. 6, 1857.
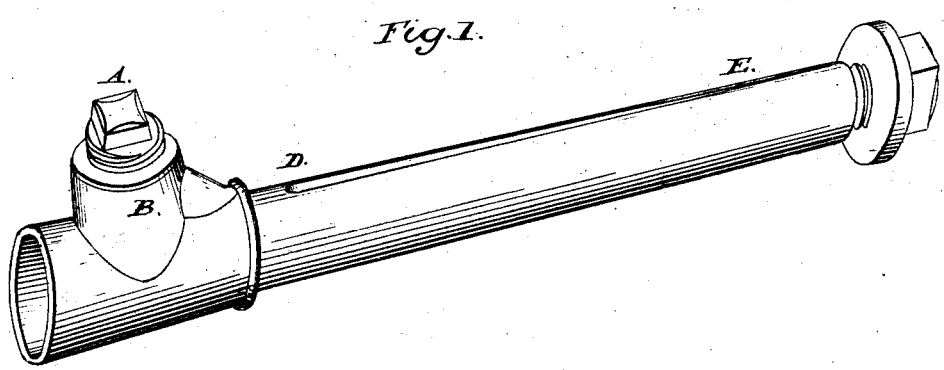
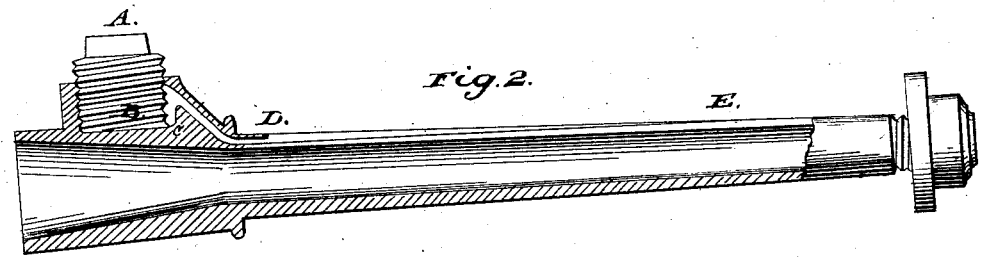

UNITED STATES PATENT OFFICE.

ALBERT A. VEDDER, OF LYSANDER, NEW YORK.

LUBRICATING CARRIAGE-AXLES.

Specification of Letters Patent No. 18,364, dated October 6, 1857.

*To all whom it may concern:*

Be it known that I, ALBERT A. VEDDER, of Lysander, in the State of New York, have invented a new and Improved Mode of Lubricating Axles; and I do hereby declare that the following is a full and exact description thereof, reference being had to the accompanying drawings and to the letters of reference marked thereon.

The nature of my invention consists in providing a reservoir of grease or oil in such a manner as to force the grease or oil on to the axle by means of a screw, without taking off the wheel.

To enable others skilled in the art, to make and use my invention, I will proceed to describe its construction and operation.

I construct my axle in any of the known forms, and apply a reservoir at a convenient point as at B, in the accompanying drawings (of which Figure 1 is a perspective, and Fig. 2 a longitudinal section) in which I place a screw A, leaving a space for the grease or oil.

C is a tube or channel leading from the top of the space B, to the aperture at D. From D, to E, there is a groove, which tapers and runs out at E, to distribute the grease or oil evenly over the whole surface, as the wheel turns.

What I claim as my invention, and desire to secure by Letters Patent, is—

The manner of lubricating axles by means of a reservoir, screw, and suitable conduit, as herein described, or any other manner substantially the same, and which will produce the intended effect.

ALBERT A. VEDDER.

Attest:
W. A. MAYNARD,
C. F. WILLIE,
CLARK BERRY.